United States Patent [19]

Favreau et al.

[11] Patent Number: 4,469,992

[45] Date of Patent: Sep. 4, 1984

[54] CIRCUIT FOR CORRECTING EAST-WEST PINCUSHION DISTORTIONS

[75] Inventors: Jean-Claude Favreau, Tannheim; Uwe Hartmann, Villingen-Swenningen; Udo Mai, Tannheim, all of Fed. Rep. of Germany

[73] Assignee: Deutsche Thomson-Brandt GmbH, Villingen-Schwenningen, Fed. Rep. of Germany

[21] Appl. No.: 515,916

[22] Filed: Jul. 20, 1983

[51] Int. Cl.³ .............................................. H01J 29/56
[52] U.S. Cl. .................................................. 315/371
[58] Field of Search ........................ 315/371, 370, 408

[56] References Cited

U.S. PATENT DOCUMENTS 4,206,388  6/1980  Ishigaki et al. ...................... 315/371

*Primary Examiner*—Theodore M. Blum

*Attorney, Agent, or Firm*—Horst M. Kasper

[57] ABSTRACT

A circuit is provided for the correction of east-west pincushion distortions on the picture screen of a television receiver. The circuit includes a diode modulator, which is controlled viz a coupling coil from a control stage switched by a horizontal scanning frequency, frame frequency modulated rectangular signal as well as a diode connected to the coupling coil for returning of stored energy to an electrical energy supply source of the television receiver. An electronic switch is connected in parallel to the diode. A rectangular pulse signal is applied to the control electrode of the electronic switch. The polarity of the switching connection provided by the electronic switch is opposite to that of the diode. The electronic switch permits a current directed oppositely to the current running through the diode to pass through the coupling coil during the non-conducting phase of the control stage.

10 Claims, 1 Drawing Figure

CIRCUIT FOR CORRECTING EAST-WEST PINCUSHION DISTORTIONS

DESCRIPTION

BACKGROUND OF THE INVENTION

1. Field of the Invention

The present invention relates to the correction of east-west pincushion distortions on the picture screen of a television receiver incorporating a diode modulator, which is controlled by a control stage switched by a line frequency, frame frequency modulated rectangular pulse signal via a coupling coil as well as a diode connected to the coupling coil and which is serving to return stored energy to an electrical energy supply source of the television receiver.

2. Brief Description of the Background of the Invention Including Prior Art

The invention has a starting point a circuit for correcting east-west pincushion distortions on the picture screen of a television receiver with a diode modulator. Such a diode modulator is described for example in detail in the German Patent DE-PS No. 2,031,218. The correction current required for the correction of the above named pincushion distortions is fed to the diode modulator. The diode modulator is here controlled with the aid of a stage, which supplies horizontal scanning frequency rectangular pulses vertically modulated as to their width. It is known to connect a diode to the coupling coil for the return of energy, which diode feeds back energy stored in the coupling coil to an energy supply source of the television receiver. It is known to transform the digital rectangular signal via an RC-member into a parabolic shape signal of frame frequency. It is further known to integrate the digital rectangular signal via an LC-member into a parabolic shape signal of frame frequency which serves to the control stage as negative feedback as well as is fed to the coupling coil for modulating the deflection current.

The first circuit is in fact advantageous from a cost point of view, however it is associated with the disadvantage that the current through the coupling coil during the blocked phase of the control stage can only run in one direction in view of the diode serving to gain energy. Thereby the degree of modulation of the diode modulator circuit is severely limited. This degree of modulation again can be increased by increasing the bridge voltage of the diode modulator, which however reduces the degree of efficiency of the circuit.

The second circuit with the LC-member in fact allows two current directions in the coupling coil based on the capacitor in the integration member such that the full degree of modulation of the diode modulator can be employed. However, this solution is not very advantageous as to costs (German Patent Application Laid Out DE-AS No. 2,809,198) based on the device components employed (inductance and capacitance).

In addition, a circuit provision is known for the correction of east-west distortions of pincushions (German Patent Application Laid Open DE-OS No. 3,124,424), which employs an A-amplifier stage. A modulator circuit generates a sawtooth shaped modulator current with an inductivity, which charges a modulation capacitor. A bias voltage of vertical frequency for the A-amplifier stage changes the shunt current parabolically with the vertical frequency in the direction of an east-west correction. The voltage at the modulation capacitor, which is connected in parallel to the transistor of the amplifier stage, can increase to an undesired size endangering the transistor in case of faulty operating conditions. Therefore, the transistor is clamped via a diode to the voltage of the operating voltage source in order to protect the transistor. The purpose of the diode in this context is to not recover energy back.

SUMMARY OF THE INVENTION

1. Purposes of the Invention

It is an object of the present invention to provide a circuit which provides an advantageous solution for regaining energy in a circuit for correction of east-west pincushion distortions.

It is a further objective of the present invention to provide a cost favorable solution for a television receiver distortion correction circuit under retaining of the full degree of modulation.

It is another object of the present invention to provide a circuit which is adapted to control the current flow backward to the energy source over the nearly full cycle of operation.

2. Brief Description of the Invention

The present invention provides an electronic circuit for correcting east-west pincushion distortions on the picture screen of a television receiver. An electrical energy supply source provides voltage to the television receiver. A control stage is switched by a horizontal scanning frequency, frame frequency modulated periodic signal. A diode modulator is controlled by the control stage via the coupling coil; a diode connected to the electrical energy supply source for returning stored electrical energy to the electrical energy supply source and connected to and switched by the coupling coil. An electronic switch is disposed in parallel to the diode and has its control electrode fed with the periodic signal. The polarity of the passage direction of the current is opposite for the electronic switch as compared to the diode such that the switch permits an electronic current through the coupling coil which is directed opposite to the diode current direction during the nonconducting phase of the control stage.

The control stage can be provided by a switching transistor. The control signal can be a rectangular signal. A differential amplifier can have its output connected to the control terminal of the electronic switch and to the control input of the control stage. The electronic switch can be provided by a circuit comprising a transistor. A parabola voltage generator can be connected as one input to the differential amplifier. A saw tooth voltage generator can be connected to one input of the differential amplifier. The electrical switch can be a transistor and the transistor and the diode form part of an integrated circuit.

There is provided in particular an electronic circuit for correcting pincushion distortions of the picture sceen of a television receiver including a diode modulator, which diode modulator is controlled via a coupling coil by a stage switched by a horizontal scanning, frame frequency modulated rectangular signal as well as a diode connected to and operated by the coupling coil for providing return of stored energy to an electrical supply voltage source of the television receiver. An electronic switch is connected in parallel to the diode, where the control electrode of the electronic switch is fed with the rectangular signal, where the polarity of the electronic switch is opposite to that of the parallel diode such that the electronic switch permits a current directed oppositely to the diode current to run through the coupling coil while the control stage is in a nonconducting state.

Further, a method is provided for correcting east-west pincushion distortions on the picture screen of a television receiver. A diode modulator is controlled via a coupling coil with a control stage. A diode is connected to the coupling coil. The control stage is switched by a horizontal scanning frequency, frame frequency modulated rectangular signal. Stored energy is returned to an electrical power supply source of the television receiver by way of the diode. An electronic switch is disposed in parallel to the diode. The rectanguar signal is applied to the control electrode of the electronic switch. The polarity of the open path of the electronic switch is opposite to that of the diode such that the electronic switch permits a current running opposite to the diode current such that the electronic switch during the nonconducting phase of the switched stage permits a current directed oppositely to the diode current through the coupling coil.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
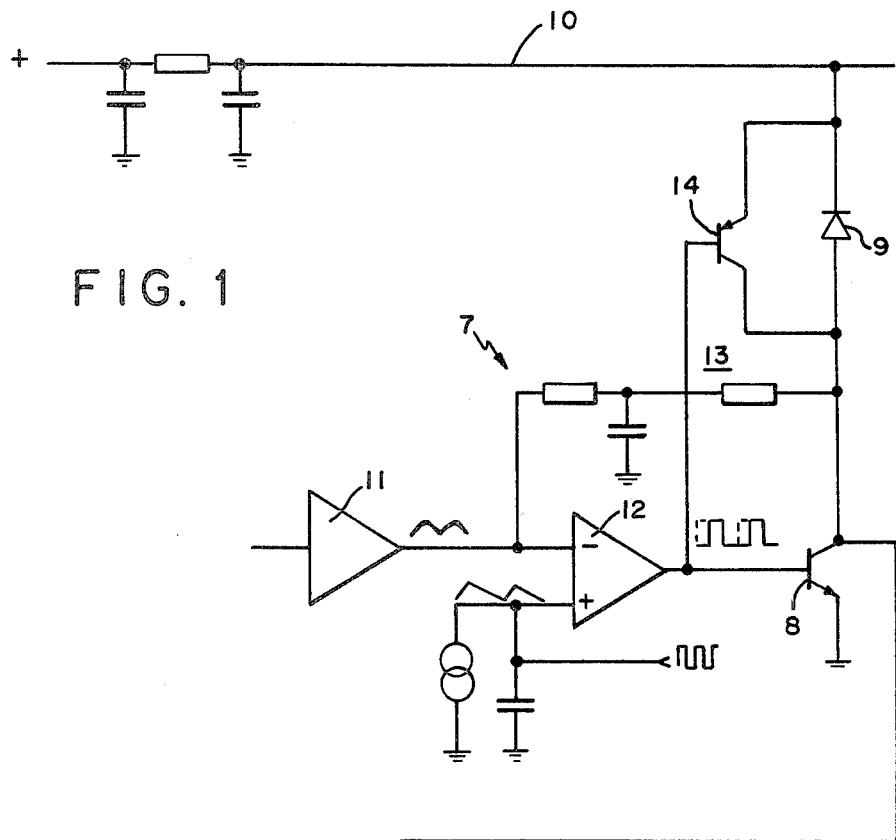
FIG. 1 is a view of a schematic partial circuit diagram for a television receiver showing the section providing correction of east-west pincushion distortions.
Figure 1:
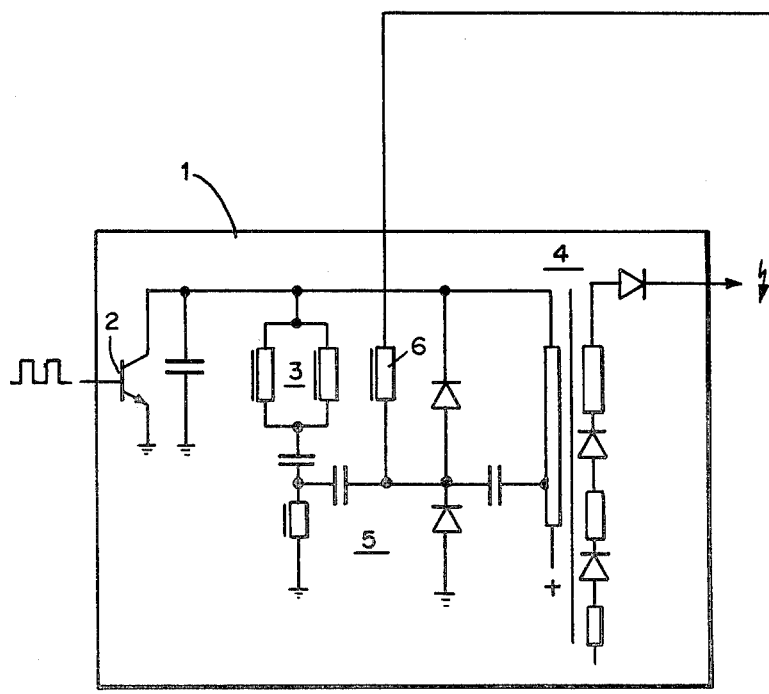

In accordance with the present invention there is provided a circuit for the correction of east west pincushion distortions on the picture screen of a television receiver set employing a diode modulator and a diode connected to the coupling coil of the diode modulator for returning stored energy to an energy supply source of the television receiver. An electronic switch is disposed in parallel to the diode and this electronic switch permits a current directed oppositely to the diode current through the coupling coil during the nonconducting phase of the control stage controlling the diode modulator.

The horizontal scanning final stage of a television receiver is indicated as 1, which final stage includes a line final stage transistor 2, horizontal deflection coils 3, a horizontal deflection transformer 4 and the diode modulator 5 serving to correct east-west pincushion distortions, the mode of operation which is described in the German Patent DE-PS No. 2,031,218.

The diode modulator 5 comprises a coupling coil 6. Horizontal scanning frequency, frame frequency modulated rectangular pulses are generated by a control circuit 7 and are applied to the coupling coil. The rectangular pulses produce the required modulation current via the coupling coil 6. The energy stored in the coupling coil 6 is fed back to an operating voltage source 10 of the television receiver via a diode 9 during the nonconducting phase of the switching transistor 8 of the control circuit 7. The switching transistor 8 is conventionally switched by horizontal scanning frequency rectangular pulses, which are frame frequency modulated over their width. The parabola voltage generator 11 in connection with the difference amplifer 12 serves to generate horizontal scanning pulses. The vertical frequency parabola voltage is fed to the inverting input of the differential amplifier 12 and a horizontal scanning frequency saw tooth voltage is applied to the noninverting input of the differential amplifier 12. A negative coupling 13 employing resistive and capacitance elements is provided from the collector of the switching transistor 8 to the inverted input of the differential amplifier 12. The switching section of an electronic switch 14 is disposed in parallel to the diode 9 in accordance with the present invention, which switching section can for example comprise a transistor, which permits a current from the operating voltage supply source 10 to the coupling coil 6 running oppositely to the current direction of the diode during the blocking phase of the diode. The electronic switch is advantageously operated by the same control voltage as the switching transistor 8.

The transistor 14 can be very small and can be integrated together with the diode 9 into the control circuit 7.

It will be understood that each of the elements described above, or two or more together, may also find a useful application in other types of video system configurations and high frequency signal processing procedures differing from the types described above.

While the invention has been illustrated and described as embodied in the context of a circuit for correcting east-west pincushion distortions on the picture screen of a television receiver set, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electronic circuit for correcting east-west pincushion distortions on the picture screen of a television receiver comprising
   an electrical energy supply source providing voltage to the television receiver;
   a coupling coil;
   a control stage switched by a horizontal scanning frequency, frame frequency modulated periodic signal;
   a diode modulator controlled by the control stage via the coupling coil;
   a diode connected to the electrical energy supply source for returning stored electrical energy to the electrical energy supply source and connected to and switched by the coupling coil;
   an electronic switch disposed in parallel to the diode and having its control electrode fed with the periodic signal, where the polarity of the passage direction of the current is opposite for the electronic switch as compared to the diode such that the switch permits an electronic current through the coupling coil which is directed opposite to the diode current direction during the nonconducting phase of the control stage.

2. The electronic circuit for correcting pincushion distortions of the picture sceen of a television receiver according to claim 1 wherein the control stage is provided by a switching transistor.

3. The electronic circuit for correcting pincushion distortions of the picture sceen of a television receiver according to claim 1 wherein the control signal is a rectangular signal.

4. The electronic circuit for correcting pincushion distortions of the picture sceen of a television receiver according to claim 1 further comprising a differential amplifier having its output connected to the control terminal of the electronic switch and to the control input of the control stage.

5. The electronic circuit for correcting pincushion distortions of the picture sceen of a television receiver according to claim 1 wherein the electronic switch is provided by a circuit comprising a transistor.

6. The electronic circuit for correcting pincushion distortions of the picture sceen of a television receiver according to claim 5 further comprising a parabola voltage generator connected as one input to the differential amplifier.

7. The electronic circuit for correcting pincushion distortions of the picture sceen of a television receiver according to claim 5 further comprising a saw tooth voltage generator connected to one input of the differential amplifier.

8. The electronic circuit for correcting pincushion distortions of the picture sceen of a television receiver according to claim 1 wherein the electrical switch is a transistor and wherein the transistor and the diode form part of an integrated circuit.

9. An electronic circuit for correcting pincushion distortions of the picture sceen of a television receiver including a diode modulator, which diode modulator is controlled via a coupling coil by a stage switched by a horizontal scanning, frame frequency modulated rectangular signal as well as a diode connected to and operated by the coupling coil for providing return of stored energy to an electrical supply voltage source of the television receiver, wherein an electronic switch is connected in parallel to the diode, where the control electrode of the electronic switch is fed with the rectangular signal, where the polarity of the electronic switch is opposite to that of the parallel diode such that the electronic switch permits a current directed oppositely to the diode current to run through the coupling coil while the control stage is in a nonconducting state.

10. A method for correcting east-west pincushion distortions on the picture screen of a television receiver comprising
employing a diode modulator;
controlling the diode modulator via a coupling coil with a control stage;
connecting a diode to the coupling coil;
switching the control stage by a horizontal scanning frequency, frame frequency modulated rectangular signal;
returning stored energy to an electrical power supply source of the television receiver by way of the diode;
disposing in parallel to the diode an electronic switch;
applying the rectangular signal to the control electrode of the electronic switch, where the polarity of the open path of the electronic switch is opposite to that of the diode such that the electronic switch permits a current running opposite to the diode current such that the electronic switch during the nonconducting phase of the switched stage permits a current directed oppositely to the diode current through the coupling coil.

* * * * *